(12) United States Patent
Shankar

(10) Patent No.: US 7,080,124 B1
(45) Date of Patent: Jul. 18, 2006

(54) DIGITAL MEDIA RESOURCE MESSAGING

(75) Inventor: Krishnan V. Shankar, Sammamish, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 798 days.

(21) Appl. No.: 10/028,219

(22) Filed: Oct. 24, 2001

Related U.S. Application Data

(60) Provisional application No. 60/313,503, filed on Aug. 21, 2001, provisional application No. 60/315,949, filed on Aug. 31, 2001, provisional application No. 60/324,273, filed on Sep. 25, 2001.

(51) Int. Cl.
*G06F 15/16* (2006.01)

(52) U.S. Cl. .................................. 709/206; 709/229

(58) Field of Classification Search ........ 709/204–207, 709/217–218, 229; 715/753
See application file for complete search history.

(56) References Cited

U.S. PATENT DOCUMENTS

| | | | | |
|---|---|---|---|---|
| 5,736,982 | A | 4/1998 | Suzuki et al. ............... | 345/330 |
| 5,740,549 | A | 4/1998 | Reilly et al. ................. | 705/14 |
| 5,913,032 | A | 6/1999 | Schwartz et al. | |
| 5,913,040 | A * | 6/1999 | Rakavy et al. ............. | 709/232 |
| 5,930,473 | A * | 7/1999 | Teng et al. ................. | 709/204 |
| 6,021,443 | A | 2/2000 | Bracho et al. | |
| 6,138,162 | A | 10/2000 | Pistriotto et al. ........... | 709/229 |
| 6,173,311 | B1 | 1/2001 | Hassett et al. .............. | 709/202 |
| 6,226,684 | B1 | 5/2001 | Sung et al. ................. | 709/238 |
| 6,324,587 | B1 | 11/2001 | Trenbeath et al. | |
| 6,338,086 | B1 | 1/2002 | Curtis et al. ............... | 709/218 |
| 6,424,998 | B1 | 7/2002 | Hunter ....................... | 709/207 |
| 6,560,707 | B1 | 5/2003 | Curtis et al. ............... | 713/163 |
| 6,668,273 | B1 * | 12/2003 | Rust ........................... | 709/204 |
| 6,772,335 | B1 | 8/2004 | Curtis et al. ............... | 713/163 |
| 6,795,711 | B1 | 9/2004 | Sivula ........................ | 455/466 |
| 6,807,558 | B1 | 10/2004 | Hassett et al. ............. | 709/203 |
| 6,884,172 | B1 | 4/2005 | Lloyd et al. ................ | 463/42 |
| 6,947,738 | B1 | 9/2005 | Skog et al. ............... | 455/426.1 |
| 6,957,398 | B1 | 10/2005 | Nayeri ....................... | 715/867 |
| 2001/0020247 | A1 * | 9/2001 | Ikeda et al. ................ | 709/206 |
| 2003/0005053 | A1 * | 1/2003 | Novaes ....................... | 709/204 |
| 2003/0074406 | A1 * | 4/2003 | Noble et al. ............... | 709/205 |

OTHER PUBLICATIONS

Mather, "All the News That's Fit to . . . Pointcast?" http://wwwiz.com/issue06/wiz_f05.html, 1996, download date Aug. 1, 2005.
Polaroid PhotoMAX Digital Picture Frame, User's Guide, pp. 1-22, 2000.

(Continued)

*Primary Examiner*—Dung Dinh
(74) *Attorney, Agent, or Firm*—Seed IP Law Group PLLC

(57) ABSTRACT

A digital media resource messaging system provides a convenient digital media resource viewing, managing, organizing, and editing platform that facilitates enhanced resource exchange by storing and forwarding digital media resources via a server between multiple resource-sharing partners designated by the user. In one embodiment, the digital media resource messaging system includes services to view, manage, organize, edit, and exchange digital images and video sequences.

48 Claims, 8 Drawing Sheets

OTHER PUBLICATIONS

Berger, "Ceiva Picture Frame," http://www.compukiss.com/populartopics/photoprintinghtm/ review99.htm, Dec. 1, 2000, download date Aug. 1, 2005.

The Ceiva Network, http://www.ceiva.com, Mar. 31, 2001, download date Aug. 1, 2005.

Ozer, "Your Best Shots," http://www.pcmag.com/print_article2/0,1217,a=7073,00.asp, Aug. 1, 2001, download date Aug. 1, 2005.

Watson, Jennifer, et al., *Your Official America Online Tour Guide*. Hungry Minds Inc., 6th Edition, Nov. 1, 2000.

* cited by examiner

DIGITAL MEDIA RESOURCE MESSAGING

RELATED APPLICATIONS

This non-provisional application claims priority to provisional application No. 60/313,503 entitled "System And Method For Sharing And Viewing Digital Pictures" filed on Aug. 21, 2001, provisional application No. 60/315,949 entitled "System And Method For Sharing And Viewing Digital Pictures" filed on Aug. 31, 2001, and provisional application No. 60/324,273 entitled "System And Method For Sharing And Viewing Digital Pictures" filed on Sep. 25, 2001, the specifications of which are hereby fully incorporated by reference.

BACKGROUND OF THE INVENTION

1. Field of the Invention

The invention relates generally to the field of data processing and, in particular to the exchange, display and manipulation of digital media resources such as image and video files.

2. Background Information

Over the years, digital imaging has gained considerable popularity with both consumers and professionals alike. In the past, individuals would use an optical scanner to digitize conventional print-based photographs in order to create an electronic version of the image that could be manipulated and/or exchanged with colleagues as well as friends and family. Although optical scanners remain in use today, digital photography involving the use of digital cameras to capture multiple high-resolution color images which are then digitally stored in a memory storage device rather than onto conventional emulsion-based film, has continued to gain attention. Because the digital images are stored in memory, they may be instantly viewed on the camera (i.e. using an included display screen) without the need for lengthy and costly development processes required by conventional film. Additionally, as soon as the electronic images are captured, they may be uploaded to a computer for subsequent exchange with friends and family via the Internet for example.

In the past, individuals having access to the Internet were limited to using electronic mail as a means of exchanging digital images. Although this was considered a relatively fast way of exchanging images with people in varied locations around the world, the various user interfaces available for sending the images proved difficult to use. For example, if a user wished to email images to multiple parties, the user would either have to send individual email messages to each desired recipient, which proved time consuming, or send a single message addressed to each recipient on a mailing list. Although the mailing list accelerated image distribution, there was no straightforward way to designate that different pictures be sent to different addressees without creating separate mailing lists. Once the recipient received the email, they had to download and save the attached images, which frequently resulted in the user losing track of where they saved these images. Furthermore, to view the images, the user would have to click on the images one by one and open and view them individually in a web browser or other imaging application. If the images were too large to fit the available viewing area, the user would be forced to use a zoom function, if available, in order to view the image in its entirety, or be forced to pan across the image.

With the increase in popularity of the World Wide Web coupled with readily available web page editing software, individuals soon began to create personal web sites to display their various digitized photographs and electronic images to family and friends. Although this method provided one way to display images to a geographically diverse group of people, there was often very little security associated with such personal web sites allowing more than the intended audience to view one's personal images. Additionally, the intended viewing audience of the personal web site would have to repeatedly check back in order to determine if the web site owner/editor posted any new pictures. Further still, all image viewing was required to be conducted while the viewer remained on-line. If a given portfolio contained high-resolution images for example, the downloading and viewing time could be considerable. Furthermore, the user had to have at least some familiarity with how to author a web page containing these pictures.

To address the various privacy issues and other limitations involving the posting of images, photo-sharing services were introduced. As with personal web pages, these photo-sharing web sites enabled individuals to upload and store digital images that could be viewed by others over the Internet. The main difference was that the images would be stored in an area of the web site dedicated to that individual and could be password protected to limit viewing by unintended parties. Notwithstanding this, however, image viewing still needed to be conducted on-line, which resulted in very poor performance due in part to the unreliably variable speed of response from the Internet. Any picture editing functionality provided by the website was even more adversely affected by the unreliable speed of response. Additionally, the service providers hosting the photo-sharing services were required to maintain extremely large file storage capacities as each image is filed on a photo-sharing server for perpetuity.

More recently, digital picture frames have been introduced as another mechanism for sharing digital images. Briefly, digital picture frames are special purpose devices that contain liquid crystal display (LCD) screens (typically in the 5"×7" or 8"×10" size range) that are capable of displaying digital images of a limited resolution. One particular digital picture frame available from Ceiva Logic, Inc. of Burbank, Calif. uses a standard telephone line to connect to a picture server in order to download a predefined number of images. Before the images may be downloaded to the digital picture frame, however, the owner or another party authorized by the owner must first upload these images to the picture server through the use of a separate browser-equipped computer or appliance. Additionally, while the digital picture frame is downloading the images, the phone line is tied up thereby preventing other tasks such as web browsing or email to be contemporaneously carried out. Furthermore, digital picture frames do not provide image editing and/or manipulation capabilities. For example, users cannot prevent some pictures from being displayed, or brighten them up, and so on. Also, the images displayed on the digital picture frames cannot be shared with other friends or concurrently viewed by multiple parties. For example, if a grandmother who owns a digital picture frame were to receive images of her granddaughter uploaded from by her son, the grandmother would not be able to share the images with anyone over the Internet let alone anyone outside of the view of the digital picture frame.

BRIEF DESCRIPTION OF THE DRAWINGS

The invention is illustrated by way of example, and not by way of limitation in the figures of the accompanying drawings in which like reference numerals refer to similar elements, and in which.

DETAILED DESCRIPTION

A digital media resource messaging system is described herein. In one embodiment, a photo-management software client provides a convenient image viewing, managing, and editing platform that facilitates enhanced image exchange by storing and forwarding image files via a server between multiple resource-sharing partners designated by the user. In the following description, unless otherwise noted, the terms "image", "photo", "photograph", and "picture" are used interchangeably to refer to digital images that are capable of being rendered on a display device such as a CRT or liquid crystal display (LCD) for example. Furthermore, the phrase "digital media resource" is intended to be broadly construed to refer to digital images as well as digital video, one or more digital video frames, and even text files and other documents. Additionally, the term "buddy" is used herein to refer to one or more resource-sharing partner(s) with whom the user may opt to share one or more digital media resources. Moreover, a "buddy list" refers to a list of individuals (whether represented by first and/or last name, username, or email address) with whom a user has chosen to share digital media resources.

For purposes of explanation, specific numbers, materials and configurations are set forth in the following description in order to provide a thorough understanding of the invention. It will be apparent, however, to one skilled in the art that the invention may be practiced without these specific details. In some instances, structures and devices are shown in block diagram form in order to avoid obscuring the invention. In other instances, well-known features are omitted or simplified in order not to obscure the present invention. For ease of understanding, certain method steps are delineated as separate steps, however, these separately delineated steps should not be construed as necessarily order dependent in their performance. Furthermore, reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
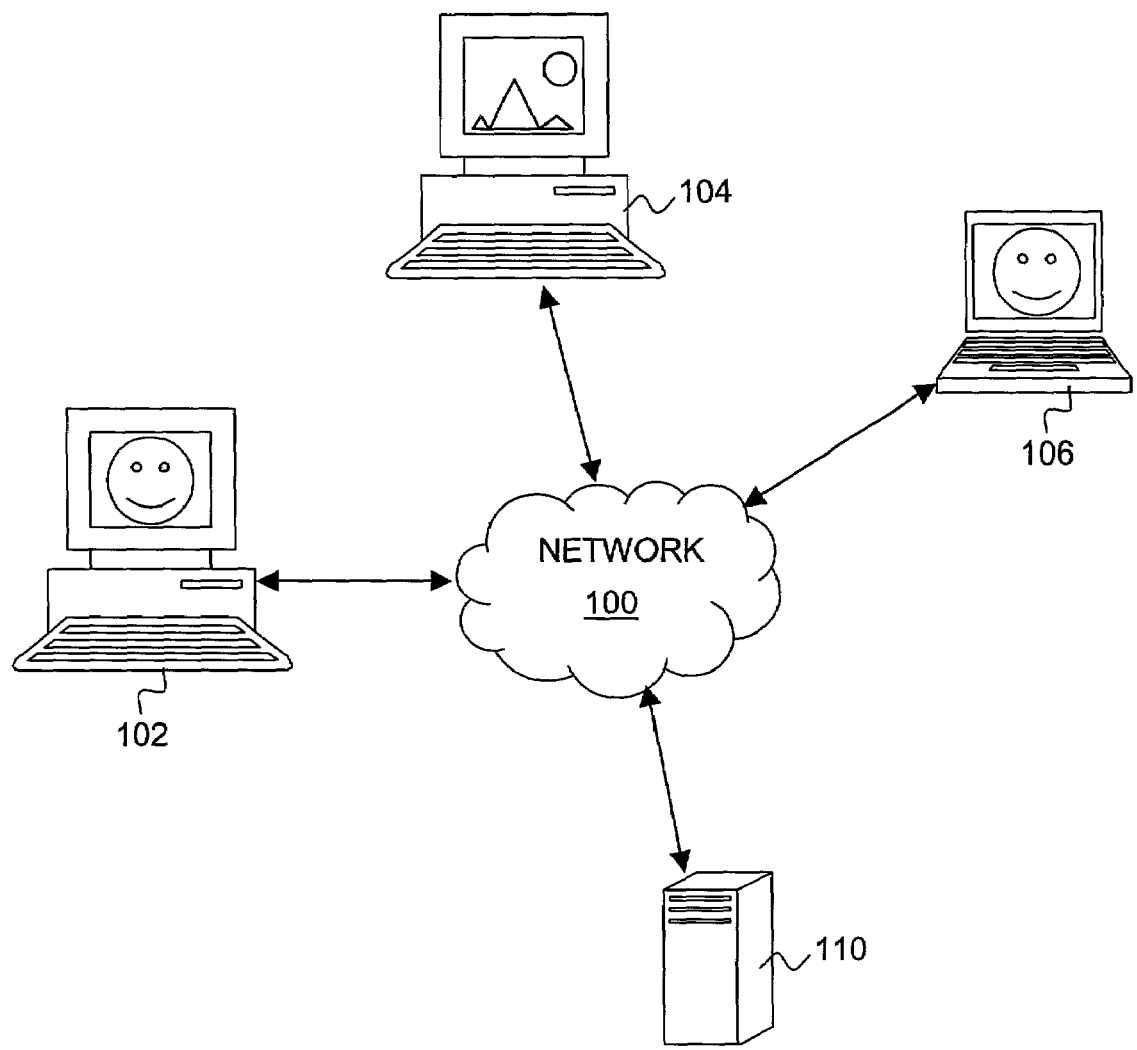
FIG. 1 illustrates an overview of the present invention.

FIG. 1 illustrates an overview of the present invention in accordance with one embodiment. In FIG. 1, a digital media resource messaging system is illustrated. The digital media resource messaging system includes computer systems 102, 104, 106 and server 110, each communicatively coupled together via network 100 and incorporated with the teachings of the present invention. Computer systems 102, 104 and 106 each represents a general-purpose computer system such as, but not limited to a desktop computer, laptop computer, and palmtop computer, as well as a personal digital assistant (PDA). Each of computer systems 102, 104, 106 is equipped with a display device such as a CRT or LCD to display one or more digital media resources including images that may be shared with one or more resource sharing partners. For the purpose of this discussion, the respective users (not shown) of computer systems 102, 104, 106 are each assumed to be resource-sharing partners with one another. That is, each respective user of computer systems 102, 104, 106 has been identified to each other user (e.g. through a graphical user interface "GUI" described below) as a resource-sharing partner.

For example, in accordance with the teachings of the present invention, the user of computer system 102 may elect to share one or more images with the user(s) of computer system(s) 104 and/or 106 as resource-sharing partners. The image(s) may be stored locally on computer system 102 or remotely on another data storage device within the messaging system of FIG. 1. In an embodiment where the images are stored locally on the originating (i.e. uploading) computer system, the corresponding user is prompted (again through a GUI) to identify which digital media resources are to be shared with one or more other resource-sharing partner recipients. In one embodiment, once the digital media resources have been identified, they are uploaded to server 110 where they are temporarily stored until the next subsequent login by the designated resource-sharing partner recipient(s). In other embodiments, server 110 stores the resources for a predetermined length of time, such as a period of weeks, and purges the resources after that duration, whether or not all the intended recipients have logged in and downloaded the resources.

Upon logging in to server 110, the stored digital media resources are transparently downloaded (either automatically, or upon the recipient's explicit approval, e.g. depending on which option the recipient has selected for resource downloads) to each designated recipient's respective computer system in the background leaving the recipient(s) free to perform any number of other tasks such as viewing, editing or sharing resources, browsing the web, checking email, and so forth. In accordance with the present invention, both sender and recipient need not be logged in to the server at the same time in order to share digital media resources. In one embodiment, the digital media resources are uploaded to, and downloaded from server 110 using the well-known hypertext transfer protocol (HTTP). In some embodiments, the system may also use other protocols than HTTP, for example FTP or TCP-IP. Once the digital media resources have been downloaded (or prior to uploading), the recipient user is able to perform any number of tasks on or with the digital media resources. For example, in the event the digital media resources comprise digital images, a user recipient may have the option of viewing the downloaded images, editing the images, organizing the images, and so forth. In one embodiment, the downloaded digital media resources are automatically displayed on the corresponding computer system in the form of a screen saver, whereas in another embodiment, the downloaded digital media resources are automatically displayed in the form of background wallpaper on the display device. In other embodiments, the downloaded digital media resources may be displayed as part of an Active Desktop on the corresponding computer system, or even on a TV screen.

In one embodiment, once the digital media resources have been downloaded to one or more computer systems, server 110 removes the digital media resources from memory thereby decreasing perpetual storage requirements of server 110. Additionally, since the digital media resources are downloaded to the various computer systems, the digital media resources may be viewed or accessed offline by the users, thereby eliminating delays caused by slow and often unreliable network connections. In one embodiment, server 110 generates and stores a meta-data file in association with each digital media resource the server receives. The meta-data file may include items of information such as the resource file name, file size, content type, creation date, who uploaded the resource and when, as well as who downloaded the resource and when. The meta-data files facilitate resource searches by server 110 without the need to uncompress any stored resource files. These resource searches can be constrained to specific criteria and combinations of criteria, such as locating all files created by user "Jim" after Oct. 16, 2001 and smaller than 500K. In one embodiment, if a user requests a digital media resource that has since been deleted from server 110, the server utilizes the meta-data files to send a message to those prior resource recipients requesting a copy of the digital media resource. Once again, this acts to decrease the amount of storage space needed on server 110.

Network 100 represents any of a variety of communications networks equipped to transport data between various communication devices such as those illustrated in FIG. 1 for example. In one embodiment, network 100 represents a transmission control protocol/internet protocol (TCP/IP) based network such as, but not limited to the Internet. In other embodiments network 100 may represent a local area network (LAN), a wide area network (WAN), or some combination thereof. In yet another embodiment, any one or more of computer systems 102, 104, 106 may be directly coupled to each other and/or server 110 in addition to or in place of the illustrated connections to network 100. Although three general-purpose computer systems are illustrated in FIG. 1, a fewer or greater number of computer systems may instead be coupled to network 100 without departing from the spirit and scope of the invention.

Figure 2:
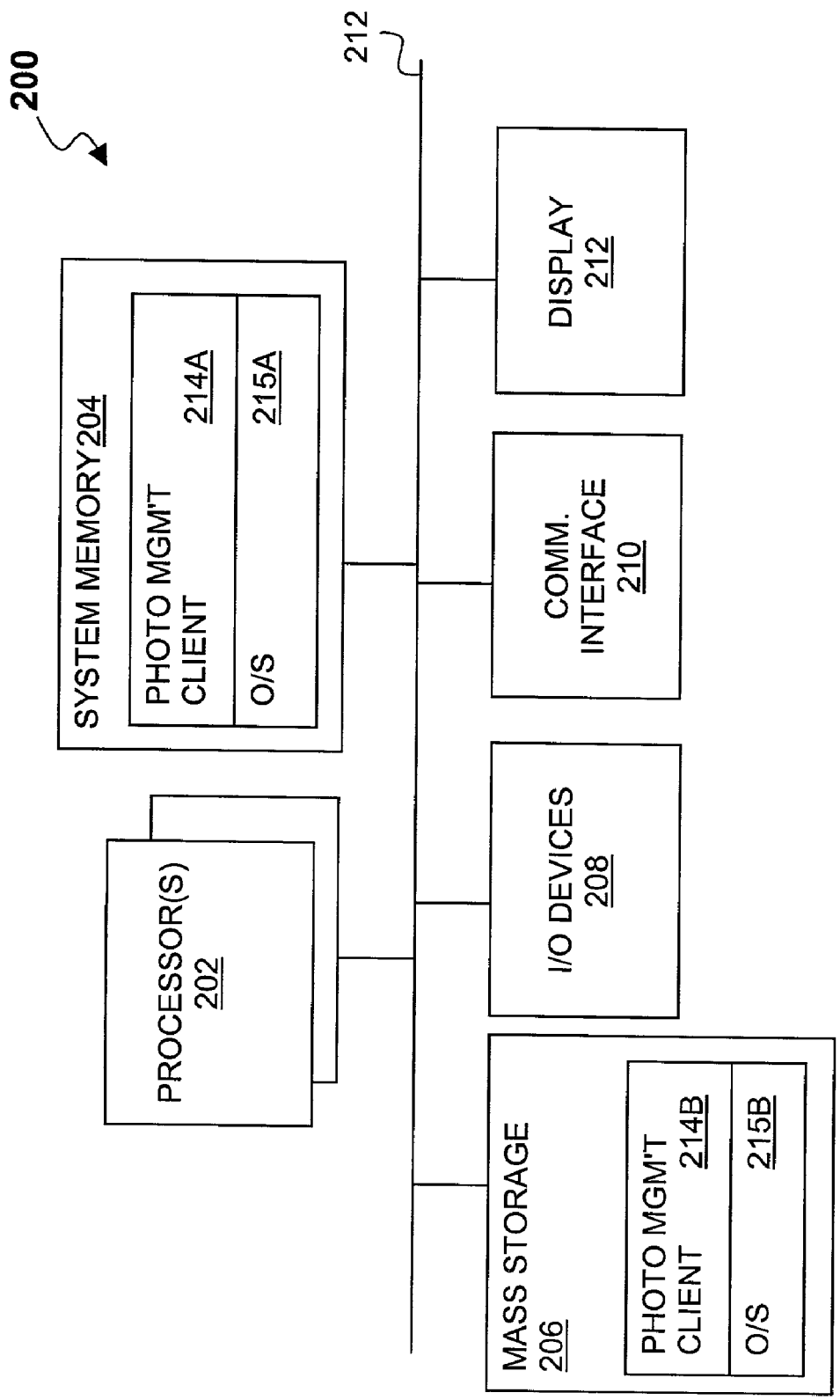
FIG. 2 illustrates an example computer system suitable for practicing the present invention in accordance with one embodiment.

FIG. 2 illustrates an example general-purpose computer system suitable for use in association with the digital media resource messaging system of the present invention in accordance with one embodiment. As shown, computer system 200 includes one or more processors 202 and system memory 204. Additionally, computer system 200 includes one or more mass storage devices 206 (such as diskette, hard drive, CDROM, DVDROM, CD/RW and so forth), input/output devices 208 (such as a keyboard, cursor control devices and so forth), communication interfaces 210 (such as network interface cards, modems and so forth), and display interfaces/devices 212. The elements are coupled to each other via system bus 212, which represents one or more buses. In the event that system bus 212 represents multiple buses, the busses may be bridged by one or more bus bridges (not shown).

Except for the teachings of the present invention, each of these elements performs its conventional functions known in the art. In particular, system memory 204 and mass storage 206 are employed to respectively store a working copy and a permanent copy of the programming instructions implementing the photo-management client 214 of the present invention, in addition to operating system 215. The permanent copy of such programming instructions may be loaded into mass storage 206 in the factory, or in the field, as described earlier, through a distribution medium (not shown) or through communication interface 210 (from a distribution server (not shown). The constitution of these elements 202–212 are known, and accordingly will not be further described.

Figure 3:
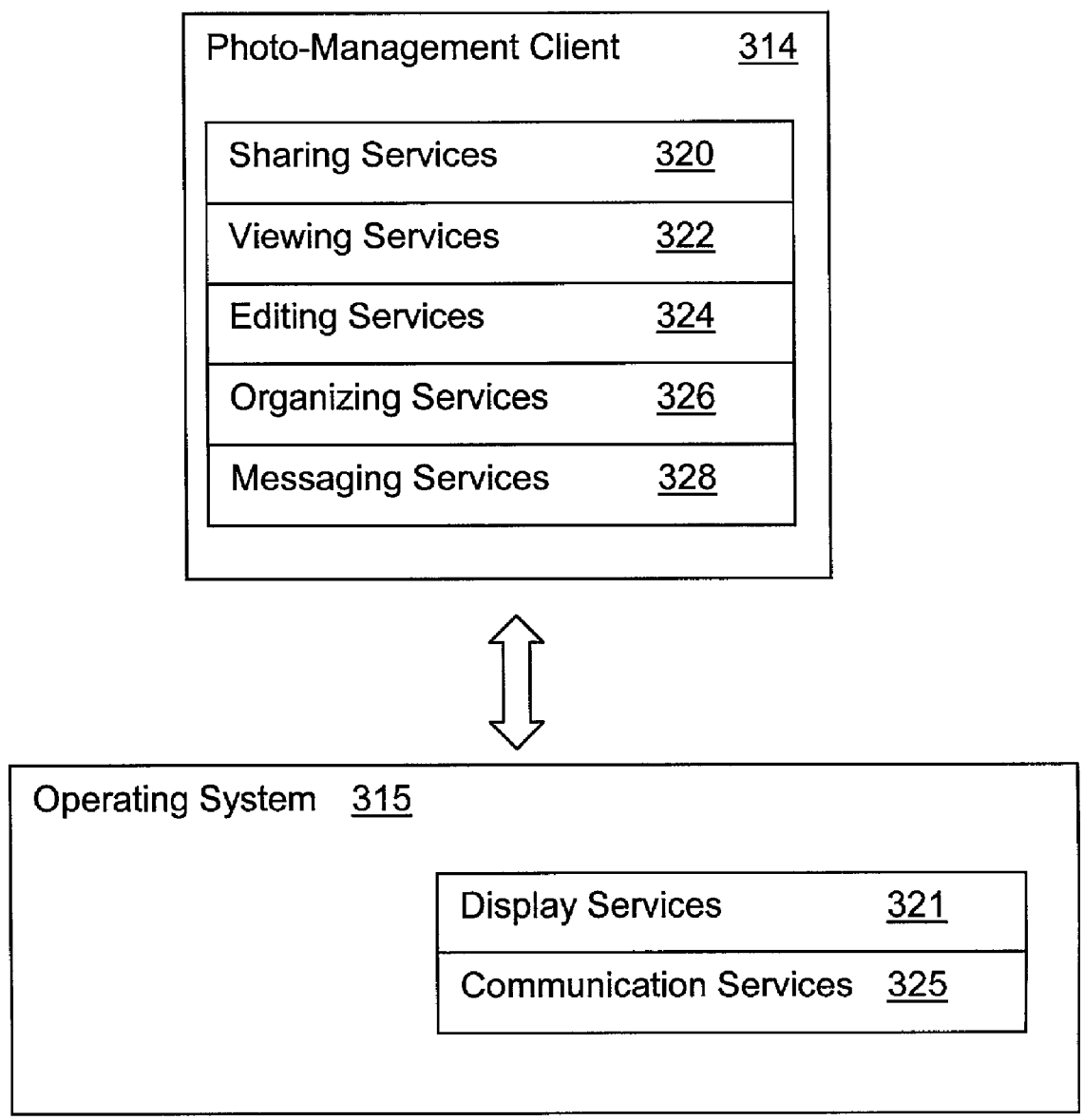
FIG. 3 illustrates software elements of the general-purpose computer system described above with respect to FIG. 2, in accordance with one embodiment.
Figure 7:
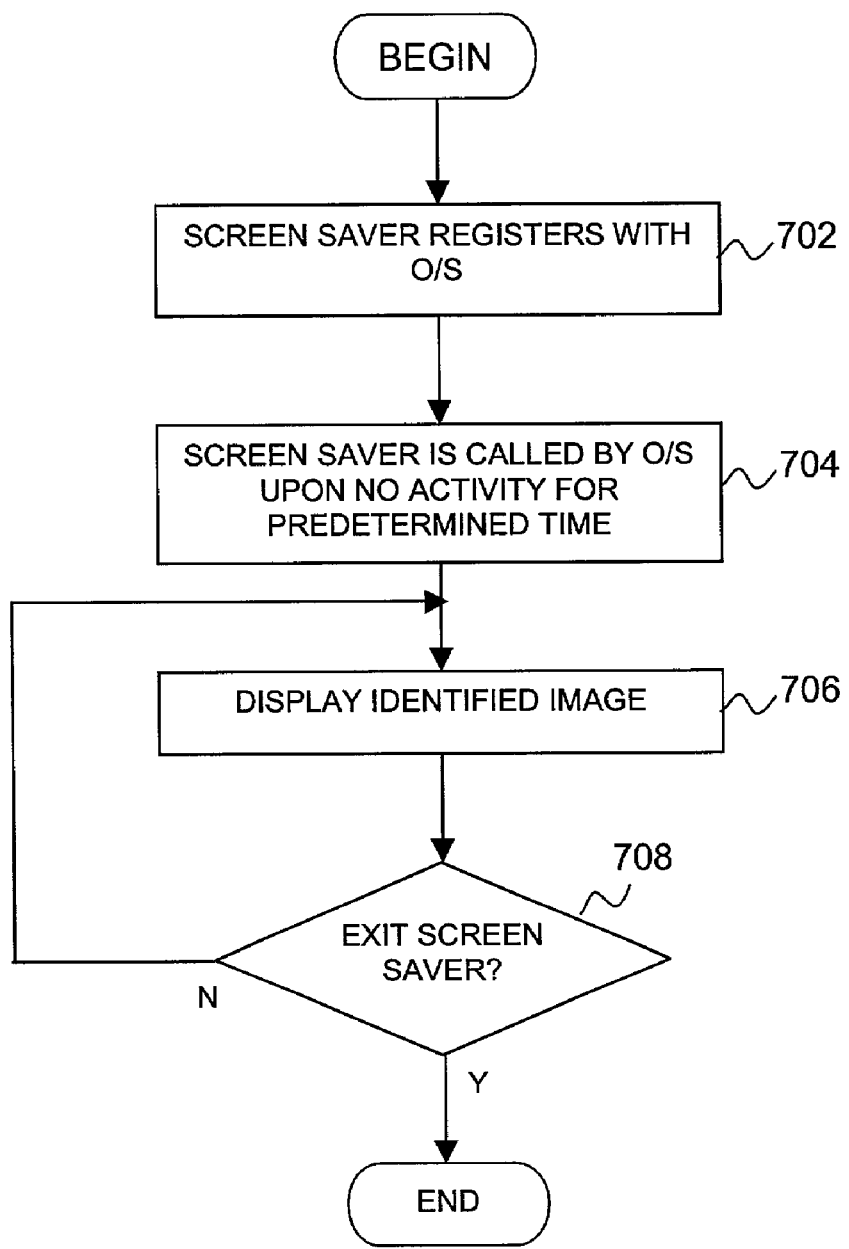
FIG. 7 illustrates an operational flow of a screen saver operational flow in accordance with one embodiment of the present invention.

FIG. 3 illustrates various software elements of the general-purpose computer system described above with respect to FIG. 2. In one embodiment, operating system 315 represents a Windows-based operating system such as WINDOWS™ 95, 98, or 2000, XP available from Microsoft Corporation of Redmond, Wash. Operating system 315 is shown to include display services 321, and communication services 325, among other functions. Communication services 325 facilitate input/output communication, including network communication, between the host computer system and external devices. In one embodiment, communication services 325 further include TCP/IP and socket services. Display services 321 facilitate the rendering of images on a display device such as a CRT or LCD. In one embodiment, display services 321 include a screen saver in the form of an application programming interface (API) that may be called by the system when, for example, the system has not detected any input/output activity during a user determinable period, or by manual activation by the user. For example, FIG. 7 illustrates an operational flow of a screen saver in accordance with one embodiment of the present invention. To begin, the screen saver is first registered with the operating system using e.g. a screen saver ID, block 702. Next, upon detecting no input/output activity for a pre-set interval of time, the operating system calls the screen saver API, block 704. When executed the screen saver API causes one or more selected digital media resources to be displayed, block 706. The screen saver then remains in an execution mode until e.g. input/output is detected, block 708.

As alluded to earlier, photo-management client 314 represents a software client that may be executed by one or more of computer systems 102, 104, and 106 to facilitate enhanced digital media resource exchange between multiple designated resource-sharing partners. In the illustrated embodiment, photo-management client 314 includes sharing services 320, viewing services 322, editing services 324, organizing services 326, and messaging services 328. Although not pictured, photo-management client 314 may further include printing services to facilitate local or third party printing of digital media resources including photos and documents.

In one embodiment, sharing services 320 provide various functionalities including the ability to share one or more digital media resources with one or more buddies by way of a user-friendly graphical interface. Viewing services 322 facilitate the viewing of downloaded digital media resources (i.e. in the form of images or video) as well as the previewing of digital media resources to be uploaded. Editing services 324 similarly facilitate manipulation and augmentation of images that have been downloaded or are to be uploaded. In one embodiment, organizing services 326 facilitate organizing and consolidating digital media resources including those resources resident locally on the user's computer system, those resources received from one or more buddies, and those resources sent to one or more buddies. In one embodiment, the digital media resources may be organized into collections using a hierarchical directory structure. In one embodiment, messaging services 328 provide messaging capabilities to the host computer system such that a user may exchange text, video and audio content with another user or resource-sharing partner. For example, in one embodiment of the invention, any resource-sharing partner may initiate a text or voice chat session with any other resource-sharing partner while the shared resources are concurrently displayed on the corresponding computer systems. Accordingly, two users may "chat" about one or more images concurrently displayed upon each user's respective display device. In one embodiment, messaging services 328 further facilitate the exchange and synchronization of resource meta-information. For example, one user may assign a rating to a particular resource, which is then conveyed to the server. The server then consolidates each rating received from various users for a given resource into an average rating for the resource. Each client who is known by the server to have received a copy of this resource is then updated/synchronized with the updated average rating the next time they log in. Additionally, the server may similarly update/synchronize other user-provided feedback including but not limited to resource-related comments.

Figure 4:
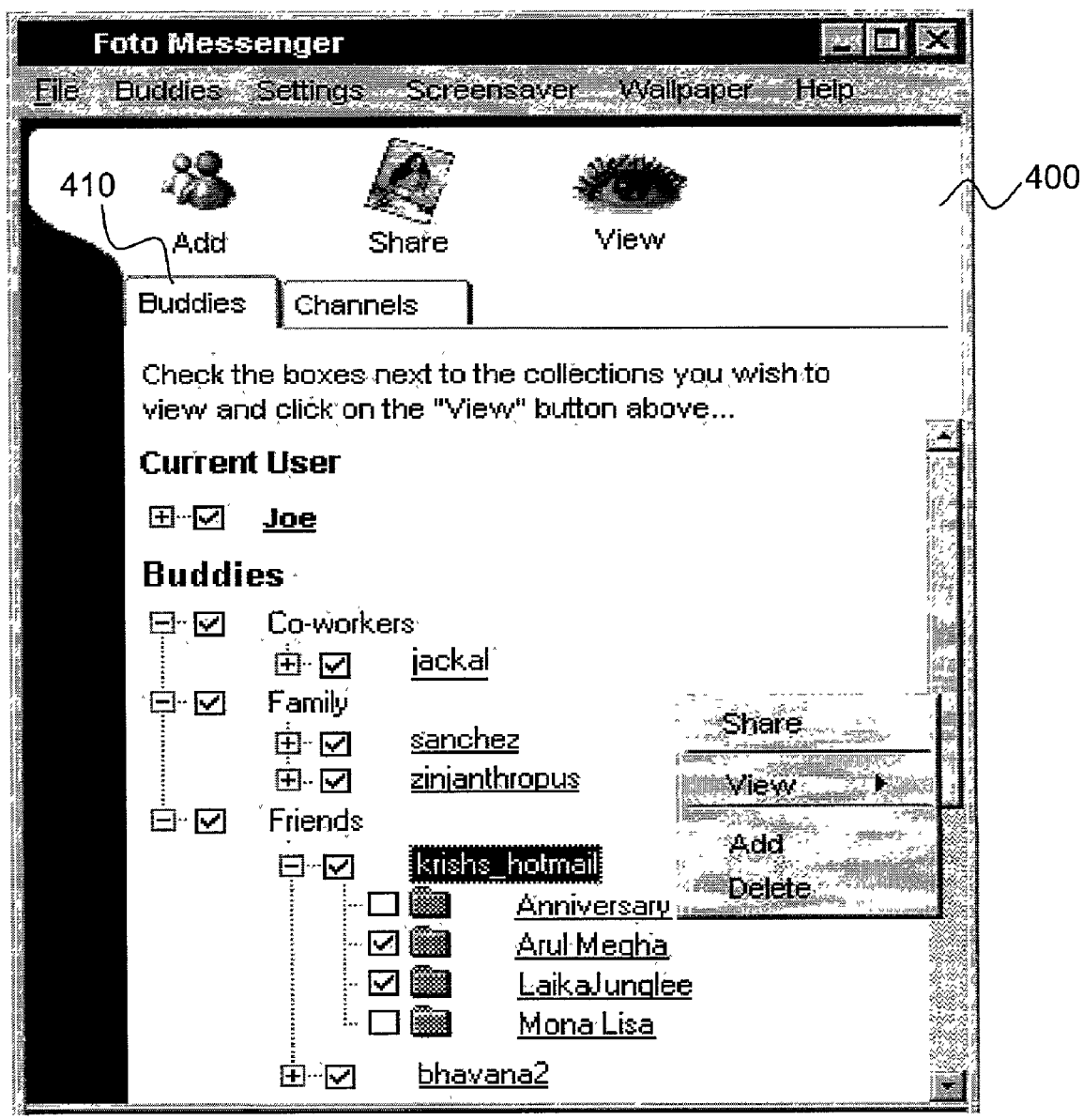
FIG. 4 represents one embodiment of a graphical user interface dialog illustrating a multi-contextual hierarchical directory tree of the photo-management client.

FIG. 4 represents one embodiment of a graphical user interface dialog illustrating a multi-contextual hierarchical directory tree of the photo-management client. Among other features, dialog 400 illustrates buddy tab 410, which when selected displays the current user (i.e. by pre-selected username), the current user's buddies and buddy lists, as well as image collections received from each buddy. In the graphical dialog of FIG. 4, the current user logged into the photo-management client is identified as "Joe" and Joe's buddy lists include "Co-workers", "Family" and "Friends". Under each Buddy List are shown individual buddies that belong to this list. In FIG. 4, the buddy list "Family" contains the buddies "Sanchez" and "zinjanthropus" displayed under it. Under each buddy is shown the picture collections received by "Joe" from that particular buddy. In the illustrated example, Joe has received four picture collections from his buddy "krishs_hotmail": Anniversary, ArulMegha, Laika-Junglee, and Mona Lisa. Furthermore, under the current user's own name are a list of collections he himself has created. In the illustrated embodiment, the buddy and collection lists can either be listed in the dialog or made hidden by clicking on the "+" and "−" signs preceding the buddy list name and the buddy name. Moreover, in accordance with the teachings of the present invention, the user can choose to have individual picture collections or all picture collections from a given user either displayed or not displayed within a client viewer, as wallpaper, or as a screensaver by checking or unchecking the check boxes preceding the buddy list, buddy and picture collection names.

In one embodiment, the photo-management client can be integrated with shell and user interface of Windows based operating systems. This allows users to initiate chatting with buddies, sharing/organizing/viewing of pictures, and managing their buddy lists from anywhere in the Windows interface, not just from the photo-management client user interface. Accordingly, a user may elect to share digital media resources with buddies in any of a number of ways. For example, a user may use the right-click feature of Windows and other operating systems to find out which buddies, if any, he has shared a particular resource with. Similarly, a user can right-click on a particular file or folder in order to share it with the user's buddies. Alternatively, the user may also use the dialog tool bar, menu, or task pane to elect to share a resource in addition to using the right-click function.

Figure 5:
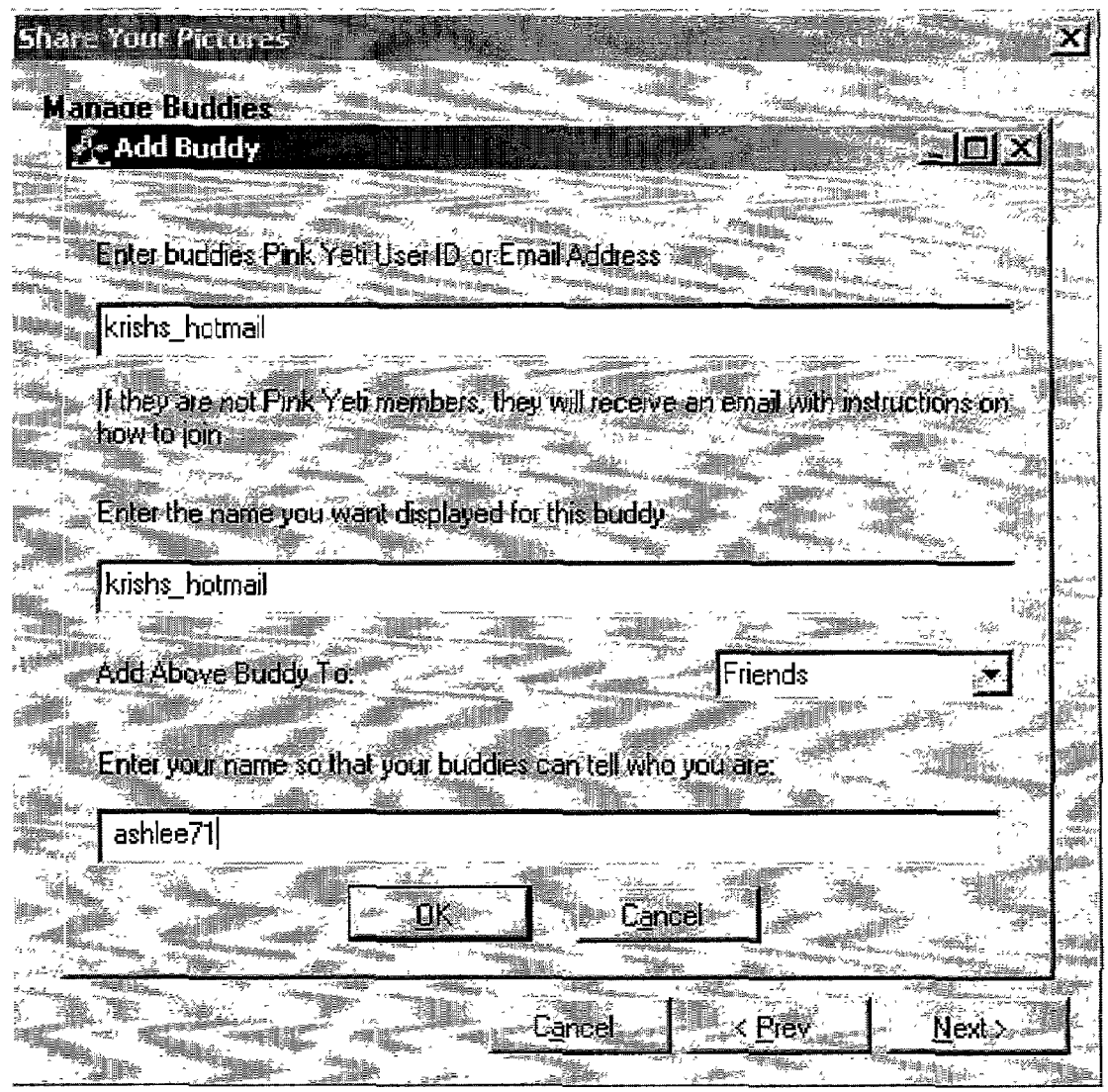
FIG. 5 illustrates one embodiment of a graphical user interface dialog for identifying new buddies.

FIG. 5 illustrates one embodiment of a graphical user interface dialog for identifying new buddies. In one embodiment, individuals may be added to a buddy list using a login username or an email name. If the buddy is added using a login name, the buddy will be notified of newly shared resources upon their next login to server 110. If, however, the buddy is added using an email name, the buddy will be notified of newly shared resources by way of an email message delivered to the associated email account. In one embodiment, the email message invites the buddy recipient to become a member of a resource-sharing network.

Figure 6:
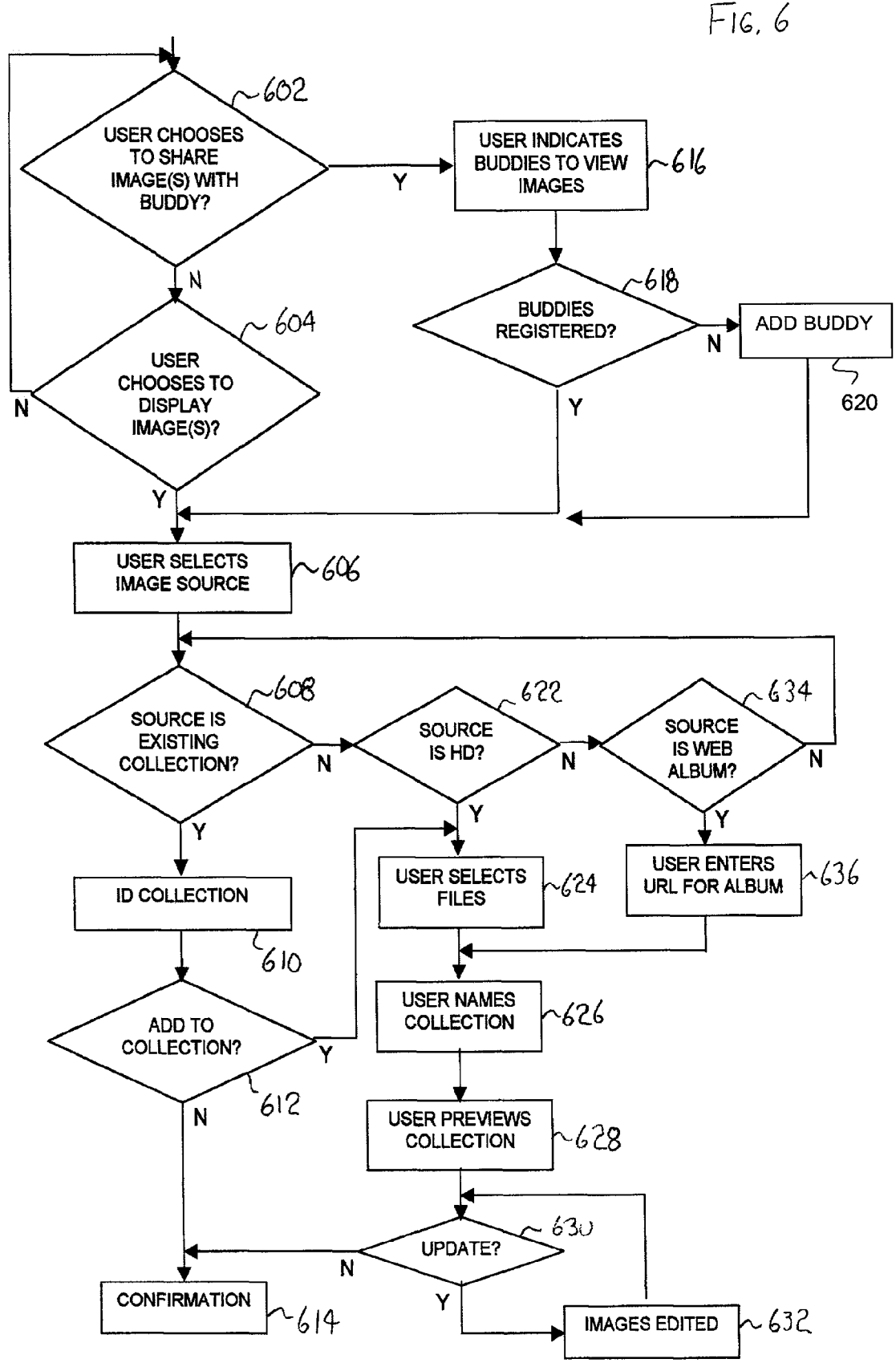
FIG. 6 is a flow diagram illustrating an operational flow of the user interface of the present invention, in accordance with one embodiment.

FIG. 6 is a flow diagram illustrating an operational flow of the user interface of the present invention, in accordance with one embodiment. The process begins with the user electing to perform some operational function within the photo-management client of the present invention. At block 602, the system determines whether the user has chosen to share one or more digital media resources (in this example, one or more images) with a buddy. If so, the user is prompted to select which buddies should receive the shared images, block 616. If the buddies are not already registered in the user's buddy list (block 618), the user is provided with an opportunity to add the buddies (block 620) before continuing to select the image source(s), block 606.

If at block 602, the user does not choose to share images with a buddy but instead chooses to display one or more images on a corresponding display screen, block 604, the user is then prompted to select the image source(s). If the user has identified one or more image sources that are part of an existing image collection, block 608, the user is prompted to identify the collection, block 610. At block 612 the user may then add additional images to a preexisting collection, or otherwise confirm the user's pending action, block 614. If back at block 608 it was determined that the image source was not part of an existing collection, the user is queried as to whether the image source is located on the local hard drive, block 622. If so, the user selects the image sources, block 624, and gives a name to the new collection of images created by such selection, block 626. At block 628, the user is provided with an opportunity to preview the collection of image resources and update them (e.g. add/delete) if it is deemed desirable, blocks 630 & 632. If the source of the image is not an existing collection (block 608) or a local hard drive (block 622), the image source may be a WWW album from one or more Internet photo sharing services, block 634. If the image source is indeed a web album from one or more Internet photo sharing services, the user is prompted to enter the URL identifying the album, block 636. Thereafter, the user is prompted to name the newly created image collection and preview/update if desired.

Figure 8:
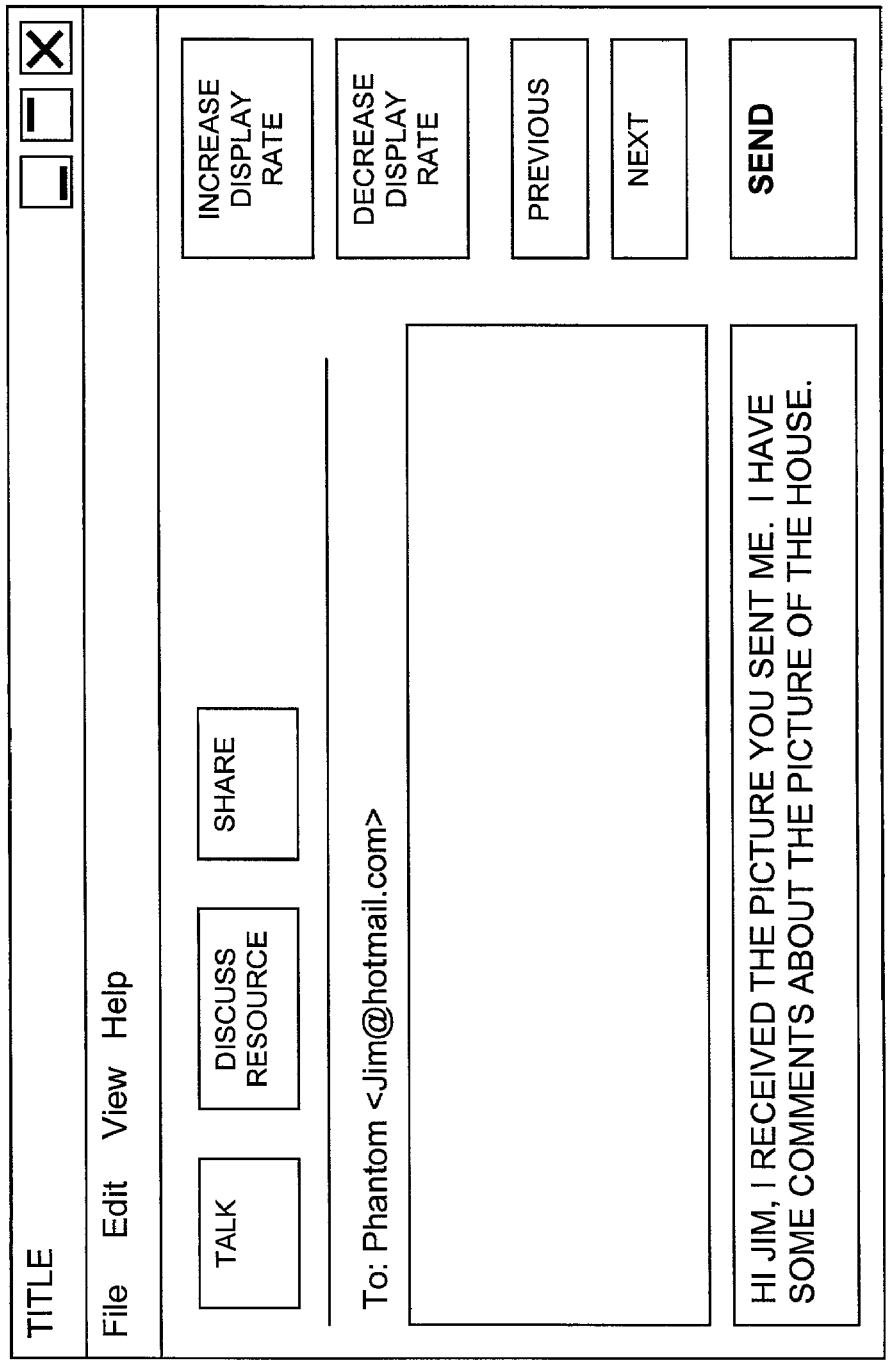
FIG. 8 represents a graphical chat window illustrating a messaging aspect of the present invention, in accordance with one embodiment.

FIG. 8 represents a graphical chat window illustrating a messaging aspect of the present invention, in accordance with one embodiment. The chat window may be displayed in a number of ways including by the user clicking (i.e. with a user input device such as a mouse) on a buddy name and choosing "Chat" in the corresponding menu that pops up. Once the chat widow appears, the user can type his message in the chat window and send it to a selected party (in the illustrated example, the selected party if "phantom"). If the user wishes to discuss a digital media resource with his buddy, the user may click on the "Discuss Resource" button on the toolbar in the chat window to pick a file for discussion. Thereafter, the resource selection dialog (previously described) pops up through which the user can select a resource. In one embodiment, the user may select resources he has shared with his buddy, resources his buddy has shared with him, or alternately, a resource that he hasn't yet shared but is nonetheless located on his computer system. The selected resource is then opened in the client viewer on both the user's and the selected buddy's clients. Additionally, the chat window is positioned on top of the displayed resource to facilitate discussion. In one embodiment, resources such as text files or other documents are opened in the appropriate application, such as Word or Excel, instead of in the included client viewer. In one embodiment, either of the user and the selected buddy may opt to increase the resource display rate, decrease the resource display rate, or manually proceed to view the next or previous resources. In one embodiment, the photo-manager client of the present invention integrates with third-party messaging applications such as Instant messenger from AOL, Yahoo! Messenger, or Windows Messenger to utilize preexisting buddy lists from these applications.

While the present invention has been described in terms of the above-described embodiments, the present invention is not limited to the embodiments described. As the present invention can be practiced with further modification and alteration within the spirit and scope of the appended claims, the description is to be regarded as illustrative instead of restrictive on the present invention.

What is claimed is:

1. In a server, a method of operation comprising:
   receiving information from a first user identifying a second user as a resource sharing partner, the first and second users being a subset of a plurality of users who each login to the server to exchange digital media resources;
   receiving information from the second user identifying the first user as a resource sharing partner;
   receiving one or more digital media resources uploaded by at least one of said first and second users;
   generating at least one meta-data file to describe at least a subset of the one or more digital media resources, the generated meta-data files including one or more indications of resource sharing partner users who uploaded the digital media resources;
   storing the at least one meta-data file in association with the one or more digital media resources described; and
   relaying the one or more digital media resources to the first user if the one or more digital media resources were uploaded by the second user, and relaying the one or more digital media resources to the second user if the one or more digital media resources were uploaded by the first user.

2. The method of claim 1, wherein said one or more digital media resources are stored on said server in a compressed form.

3. The method of claim 1 wherein the generating of the at least one meta-data file to describe at least a subset of the one or more received digital media resources includes generating a distinct meta-data file for each of the one or more received digital media resources.

4. The method of claim 3 wherein each generated meta-data file for a received digital media resource includes one or more indications of who uploaded that resource, and further comprising using the generated meta-data files to identify digital media resources uploaded by an indicated user.

5. The method of claim 3 wherein each generated meta-data file for a received digital media resource includes one or more indications of who downloaded the resource, and further comprising using the generated meta-data files to identify digital media resources downloaded to an indicated user.

6. The method of claim 5 wherein each of the digital media resources is stored in a file in compressed form, wherein each generated meta-data file for a received digital media resource further includes one or more indications of who uploaded the resource and of descriptive information for the digital media resource, and further comprising, without uncompressing the stored digital media resource files, using the generated meta-data files to identify digital media resources as being search results that match indicated search criteria.

7. In a server, a method of operation comprising:
   receiving information from a first user identifying a second user as a resource sharing partner;
   receiving information from the second user identifying the first user as a resource sharing partner;
   receiving one or more digital media resources uploaded by at least one of the first and second users;
   sending the one or more digital media resources to the first user if the one or more digital media resources were uploaded by the second user, and sending the one or more digital media resources to the second user if the one or more digital media resources were uploaded by the first user;
   for each of the one or more digital media resources, tracking the user who uploaded the digital media resource and tracking the users to whom the digital media resource is sent;
   receiving a request from one of said first or second users requesting that a copy of a digital media resource be shared with a third user, said digital media resource having been previously uploaded to said server by said requesting one of said first or second users, shared with the other of said first or second users, and thereafter removed from both said server and a computing device associated with said requesting one of said first or second users;
   identifying at least one of each user to have received a previous copy of said digital media resource based at least in part on the tracking; and
   requesting said previous copy of said digital media resource from said identified user for forwarding to said third user.

8. The method of claim 7 wherein the tracking of the users to whom a digital media resource is sent includes updating a stored meta-data file associated with the digital media resource to reflect the sending, and wherein the identifying of the at least one user to have received a previous copy of the digital media resource to be shared with the third user is based at least in part on the stored meta-data file for that digital media resource.

9. A server comprising:
   a machine accessible medium having stored thereon a plurality of instructions, which when executed, cause the computing device to
     receive information from a first user identifying a second user as a resource sharing partner, the first and second users being a subset of a plurality of users who each login to the server to exchange digital media resources,
     receive information from the second user identifying the first user as a resource sharing partner, receive one or more digital media resources uploaded by at least one of said first and second users, and relay the one or more digital media resources to the first user if the one or more digital media resources were uploaded by the second user, and relaying the one or more digital media resources to the second user if the one or more digital media resources were uploaded by the first user, said one or more digital media resources to be displayed in association with at least one of a screen saver and a wallpaper on a corresponding computing device; and a processor to execute said instructions.

10. The server of claim 9, wherein said one or more digital media resources comprise one or more digital images.

11. The server of claim 9, wherein said one or more digital media resources comprise one or more frames of digital video sequence.

12. The server of claim 9, wherein said machine accessible medium further comprising instructions to temporarily store said one or more digital media resources in association with said first or second user;

receive a data connection request from at least one of said first and second users;

authenticate the identity of said first or second user based on said data connection request; and download the one or more digital media resources associated with the authenticated user to a computing device corresponding to the authenticated user.

13. The server of claim 9, further comprising:

generating at least one meta-data file to describe at least a subset of said one or more digital media resources; and storing said at least one meta-data file in association with said one or more digital media resources described.

14. The server of claim 13, wherein said one or more digital media resources are stored on said server in a compressed form.

15. The server of claim 13, wherein said machine accessible medium further comprises instructions to:

receive a request from one of said first or second users requesting that a copy of a digital media resource be shared with a third user, said digital media resource having been previously uploaded to said server by said requesting one of said first or second users, shared with the other of said first or second users, and thereafter removed from both said server and a computing device associated with said requesting one of said first or second users;

identify at least one of each user to have received a previous copy of said digital media resource; and request said previous copy of said digital media resource from said identified user for forwarding to said third user.

16. In a server, a method of operation comprising:

receiving indications of a plurality of users who each login to the server to perform exchanges of digital images with other users;

for each of multiple of the plurality of users, receiving information from the user identifying a subset of the plurality of users whom the user has chosen resource sharing partners with whom to share digital images, the subset of users identified by each user including one or more other identified users from the plurality of users, the multiple users including a first user who has identified a second user as a resource sharing partner and including the second user who has identified the first user as a resource sharing partner;

after the first user has identified the second user as a resource sharing partner of the first user and after the second user has identified the first user as a resource sharing partner of the second user, receiving a first set of one or more digital images uploaded by the first user and receiving a second set of one or more digital images uploaded by the second user;

after receiving the first set of digital images from the first user, providing a copy of the first set of digital images to the users identified as resource sharing partners of the first user by, for each of the identified users, automatically downloading the one or more digital images of the first set in a transparent manner to a computing device associated with the identified user for display in association with at least one of a screen saver and a wallpaper on that associated computing device; and after receiving the second set of digital images from the second user, providing a copy of the second set of digital images to the users identified as resource sharing partners of the second user by, for each of the identified users, automatically downloading the one or more digital images of the second set in a transparent manner to a computing device associated with the identified user for display in association with at least one of a screen saver and a wallpaper on that associated computing device.

17. The method of claim 16, wherein said one or more digital images are each one or more frames of digital video sequence.

18. The method of claim 16 wherein the providing of the copy of the first set of digital images to the users identified as resource sharing partners of the first user includes:

temporarily storing the one or more digital images of the first set;

receiving a data connection request from a computing device associated with the second user;

authenticating the identity of the second user; and using the requested data connection for the automatic downloading of the one or more digital images of the first set to the computing device associated with the second user.

19. The method of claim 18 wherein the providing of the copy of the first set of digital images to the users identified as resource sharing partners of the first user further includes, after using the requested data connection for the automatic downloading of the one or more digital images of the first set to the computing device associated with the second user, deleting the temporarily stored one or more digital images of the first set if the second user is a last of the identified resource sharing partners of the first user to receive the one or more digital images of the first set.

20. The method of claim 18 wherein the users identified as resource sharing partners of the first user include multiple users, and wherein the temporary storing of the one or more digital images of the first set includes deleting the temporarily stored one or more digital images of the first set after a predetermined period of time has expired despite at least one of the multiple users having not received the one or more digital images of the first set.

21. The method of claim 16 wherein the providing of the copy of the first set of digital images to the users identified as resource sharing partners of the first user further includes temporarily storing the one or more digital images of the first set such that the automatic downloading of the one or more digital images of the first set for at least one of the identified users is performed while the first user is not connected to the server.

22. The method of claim 16 wherein the automatically downloading of digital images in a transparent manner to a computing device associated with an identified user includes performing the downloading in the background for the computing device while the identified user performs other tasks on the computing device.

23. The method of claim 16 wherein the automatically downloading of digital images in a transparent manner to a computing device associated with an identified user includes performing the downloading without explicit approval of the identified user.

24. The method of claim 16 wherein the users identified as resource sharing partners of the first user include multiple users, and further comprising, after the providing of the copy of the first set of digital images to at least some of the multiple users identified as resource sharing partners of the first user, receiving a rating for one of the digital images of the first set from each of one or more of the at least some users, and providing the received ratings to other of the users identified as resource sharing partners of the first user.

25. The method of claim 24 further comprising receiving ratings for the one digital image from multiple of the at least some identified users and generating an average rating for the one digital image based on the received ratings, and wherein the providing of the received ratings to the other users includes providing the generated average rating.

26. The method of claim 16 further comprising, after the providing of the copy of the first set of digital images to at least some of the users identified as resource sharing partners of the first user, receiving feedback from each of one or more of the at least some users and providing the received feedback to other of the users identified as resource sharing partners of the first user.

27. The method of claim 16 wherein, for each of at least some of the users identified as resource sharing partners of the first user and each of at least some of the users identified as resource sharing partners of the second user, the images downloaded to the computing device associated with that user are for display by a screen saver on that computing device.

28. The method of claim 16 wherein, for each of at least some of the users identified as resource sharing partners of the first user and each of at least some of the users identified as resource sharing partners of the second user, the images downloaded to the computing device associated with that user are for display as a wallpaper on that computing device.

29. The method of claim 16 wherein, for each of at least some of the users identified as resource sharing partners of the first user and each of at least some of the users identified as resource sharing partners of the second user, the computing device associated with that user is a palmtop computer.

30. The method of claim 29 wherein, for each of the at least some users identified as resource sharing partners of the first user and each of the at least some users identified as resource sharing partners of the second user, the images downloaded to the computing device associated with that user are for display by a screen saver on that computing device.

31. The method of claim 29 wherein, for each of the at least some users identified as resource sharing partners of the first user and each of the at least some users identified as resource sharing partners of the second user, the images downloaded to the computing device associated with that user are for display as a wallpaper on that computing device.

32. The method of claim 16 wherein, for each of at least some of the users identified as resource sharing partners of the first user and each of at least some of the users identified as resource sharing partners of the second user, the computing device associated with that user is a PDA.

33. The method of claim 32 wherein, for each of the at least some users identified as resource sharing partners of the first user and each of the at least some users identified as resource sharing partners of the second user, the images downloaded to the computing device associated with that user are for display by a screen saver on that computing device.

34. The method of claim 32 wherein, for each of the at least some users identified as resource sharing partners of the first user and each of the at least some users identified as resource sharing partners of the second user, the images downloaded to the computing device associated with that user are for display as a wallpaper on that computing device.

35. The method of claim 16 wherein, for each of at least some of the users identified as resource sharing partners of the first user and each of at least some of the users identified as resource sharing partners of the second user, the computing device associated with that user is a portable device.

36. The method of claim 35 wherein, for each of the at least some users identified as resource sharing partners of the first user and each of the at least some users identified as resource sharing partners of the second user, the images downloaded to the computing device associated with that user are for display by a screen saver on that computing device.

37. The method of claim 35 wherein, for each of the at least some users identified as resource sharing partners of the first user and each of the at least some users identified as resource sharing partners of the second user, the images downloaded to the computing device associated with that user are for display as a wallpaper on that computing device.

38. The method of claim 16 wherein, for each of at least some of the users identified as resource sharing partners of the first user and each of at least some of the users identified as resource sharing partners of the second user, the images downloaded to the computing device associated with that user are further for one or more of editing by that user and organizing by that user.

39. The method of claim 38 further comprising, for each of the at least some users identified as resource sharing partners of the first user and each of the at least some users identified as resource sharing partners of the second user, and under control of the computing device associated with that user, performing editing and organizing of the images that are downloaded to the computing device in response to instructions from the user.

40. The method of claim 38 wherein, for each of the at least some users identified as resource sharing partners of the first user and each of the at least some users identified as resource sharing partners of the second user, editing of the images downloaded to the computing device associated with that user includes augmenting those images in response to instructions from the user.

41. The method of claim 38 wherein, for each of the at least some users identified as resource sharing partners of the first user and each of the at least some users identified as resource sharing partners of the second user, organizing of the images downloaded to the computing device associated with that user includes consolidating those downloaded images with other images received from the user who provided those downloaded images.

42. The method of claim 38 wherein, for each of the at least some users identified as resource sharing partners of the first user and each of the at least some users identified as resource sharing partners of the second user, organizing of the images downloaded to the computing device associated with that user includes consolidating those downloaded images with other images sent to the user who provided those downloaded images.

43. The method of claim 16 wherein, for each of at least some of the users identified as resource sharing partners of the first user and each of at least some of the users identified as resource sharing partners of the second user, and under control of the computing device associated with that user, providing messaging capabilities to enable the user to communicate with another user.

44. The method of claim 43 further comprising, for each of at least some of the users identified as resource sharing partners of the first user and each of at least some of the users identified as resource sharing partners of the second user, and under control of the computing device associated with that user, communicating with the user who provided an image downloaded to that computing device while the downloaded image is displayed on that computing device.

45. The method of claim 44 wherein, for each of at least some of the users identified as resource sharing partners of the first user and each of at least some of the users identified as resource sharing partners of the second user, the communicating with the user who provided the downloaded image to that computing device is further performed while that image is concurrently displayed to that user on the computing device associated with that user.

46. The method of claim 44 wherein, for each of at least some of the users identified as resource sharing partners of the first user and each of at least some of the users identified as resource sharing partners of the second user, the communicating with the user who provided the downloaded image to that computing device includes exchanging text messages.

47. The method of claim 44 wherein, for each of at least some of the users identified as resource sharing partners of the first user and each of at least some of the users identified as resource sharing partners of the second user, the communicating with the user who provided the downloaded image to that computing device includes exchanging messages with audio content.

48. The method of claim 44 wherein, for each of at least some of the users identified as resource sharing partners of the first user and each of at least some of the users identified as resource sharing partners of the second user, the communicating with the user who provided the downloaded image to that computing device includes exchanging messages with video content.

* * * * *